United States Patent Office 3,403,120
Patented Sept. 24, 1968

3,403,120
MOULDING COMPOSITIONS BASED ON ELAS-
TICALLY THERMOPLASTIC COPOLYMER
MIXTURES
Karl-Heinz Ott and Karl Dinges, Cologne, Karl-Heinrich Knapp, Leverkusen, and Harry Röhr, Cologne, Germany, assignors to Farbenfabriken Bayer Aktiengesellschaft, Leverkusen, Germany, a corporation of Germany
No Drawing. Filed Sept. 25, 1963, Ser. No. 311,312
Claims priority, application Germany, Oct. 5, 1962,
F 37,971
6 Claims. (Cl. 260—33.6)

The present invention relates to moulding compositions which are based on elastically thermoplastic copolymer mixtures, and which have very good mechanical properties, more especially high notch impact strength, impact toughness and hardness, especially at temperatures below 0° C., while simultaneously having very good workability.

It is already known to produce thermoplastically formable rubber-synthetic plastic mixtures by blending elastic polymers based on butadiene/acrylonitrile with thermoplastic polymers based on styrene/acrylonitrile. It has also already been proposed in this connection to produce such products using graft polymers of styrene and/or acrylonitrile on polybutadiene or mixtures of polybutadiene with styrene-acrylonitrile resins.

These known thermoplastically formable compositions based on polymers of butadiene, styrene and acrylonitrile show, as a particular advantage, high impact toughness combined with higher hardness and tensile strength. On the other hand, for many purposes, e.g., for injection moulding, these known materials still have certain disadvantages, for example flow properties which require improvement. It is true that the flowability of a mixture of styrene/acrylonitrile resin and a graft polymer of styrene/acrylonitrile on polybutadiene can be improved by lowering the molecular weight of the resin components but this has the disadvantage of lowering the mechanical properties, particularly the impact strength, hardness and tensile strength. Furthermore, proposals have also been made for improving the workability of graft polymers by adding certain resins, but here also the mechanical properties of the final products are very undesirably influenced.

An additional disadvantage of many thermoplastically formable compositions which are based on polymers of butadiene, styrene and acrylonitrile is the great decrease in the notch impact toughness and impact strength at low temperatures, particularly at temperatures below 0° C. It is frequently desired in practice, however, that such thermoplastically deformable synthetic plastics should also have good mechanical properties at temperatures between 0 and —40° C.

It has now been found that thermoplastically formable synthetic plastics which are based on copolymer mixtures of an elastomeric polymer of butadiene and a thermoplastic copolymer of styrene/acrylonitrile can be obtained which have both excellent mechanical properties, particularly at low temperatures, and at the same time can very satisfactorily be worked (are flowable), if mixtures of specific copolymer types are blended with certain oils.

Thermoplastically formable synthetic plastics of this type are obtained if copolymer/mineral oil especially graft copolymer/mineral oil mixtures are prepared from the following components:

(A) 5–97%, advantageously 5–60%, by weight of a graft copolymer, produced by graft copolymerisation of (a) 10–95 parts, advantageously 10–80 parts, of a mixture of (1) 50–90% by weight of styrene and
(2) 50–10% by weight of acrylonitrile, whereby these two components may wholly or partially be replaced by their lower alkyl derivatives, on (b) 90–5 parts, advantageously 90–20 parts, of a polymer of a conjugated diolefine with at least 80% of conjugated diolefine incorporated by polymerisation, (B) 0–92%, advantageously 10–92%, by weight of a thermoplastic copolymer of (a) 50–95% of styrene and
(b) 50–5% of acrylonitrile, or the alkyl derivatives of these two monomer components, and (C) 3–30% of a mineral oil, advantageously a mineral oil with a viscosity-density constant[1] between 0.820 and 1.050.

The complete mixture of the components A, B and C should be so formed that the content of polydiolefine and oil together does not exceed 50%, so that the thermoplastic character of the complete mixture is maintained. The proportion of the sum of polydiolefine and oil should, advantageously, not be less than 10%. The ratio between polydiolefine (grafting base) and oil should be from 1:0.05 to 1:4, advantageously 1:0.5 to 1:3. The polydiolefine content of the mixture should exceed 3%, advantageously 5%.

It is apparent from the foregoing that the resin-forming monomers (i.e. styrene and acrylonitrile) are advantageously blended, as a copolymer B, with the graft polymer component A (see previous preferred ranges). It is, however, also possible for these resin-forming monomers as a whole to be grafted from the outset onto the grafting base described under A, in which case it is possible to dispense with a separate blending with a resin-copolymer component B.

According to one particular embodiment of the present invention, the grafting base of the graft copolymer component A, i.e. the polymer of a diolefine containing at least 90% of conjugated diolefine, consists of a butadiene homopolymer. According to another preferred embodiment the copolymer component B is a thermoplastic copolymer of styrene and acrylonitrile having a K-value (according to Fikentscher, "Cellulosechemie" 13, 58 (1932) ) of at least 65 and advantageously at least 70–75. More especially taking into account these preferred embodiments, products are obtained which simultaneously have a high heat stability as well as good workability and good mechanical properties. This was particularly surprising in that previous experience suggests that mixtures with resins of high K-values should have poor processability and on the other hand the heat stability should be greatly reduced by blending with oil.

According to one variant of the present invention, instead of using polybutadiene as grafting base for the production of the graft copolymer of the component A, it is possible to use copolymers of conjugated diolefines with one another, for example copolymers of butadiene with isoprene or other 1,3-dienes as well as copolymers of conjugated diolefines with up to 10% of a copolymerisable monovinyl compound, such as styrene and/or acrylonitrile. Furthermore, it is possible for the monomers to be grafted on (graft components) such as styrene and acrylonitrile, to be replaced wholly or in part by alkyl derivatives of these compounds, particularly α-methyl styrene, styrenes alkylated on the nucleus or methacrylonitrile.

---
[1] Viscosity-density consant (VDC): Relationship between specific gravity and viscosity of the oil. For more information see J. B. Hill and H. B. Coats in Ind. and Eng. Chem., vol. 20, 641 (1928).

Of particular interest as grafting base are polymers comprising at least 90% of butadiene which have a gel content (i.e. a proportion insoluble in toluene) of more than 80%.

Similarly it is also possible for styrene and acrylonitrile in the thermoplastic copolymer component B to be wholly or partly replaced by alkyl derivatives of these components, more especially α-methyl styrene and/or styrenes substituted on the nucleus or methacrylonitrile. Particularly important for this are thermoplastic copolymers consisting of 95–65% by weight of styrene and 5–35% by weight of acrylonitrile; up to 55% of the styrene may be replaced by α-methyl styrene.

Within the scope of the present invention, it is possible to employ as component C, mineral oils which are preferably judged according to their viscosity-density constant (VDC). The viscosity-density constant permits the mineral oils to be placed in different groups on the basis of their compositions. These groups are characterised as follows:

| Viscosity-density constant: | Classification of the mineral oils |
|---|---|
| 0.790–0.819 | Paraffinic. |
| 0.820–0.849 | Relatively naphthenic. |
| 0.850–0.899 | Naphthenic. |
| 0.900–0.949 | Relatively aromatic. |
| 0.950–0.999 | Aromatic. |
| 1.000–1.049 | Highly aromatic. |
| >1.050 | Extremely aromatic. |

Particularly suitable are mineral oils which have a viscosity-density constant of 0.820–1.050, i.e. naphthenic or aromatic mineral oils.

The graft copolymer component A can be produced in a manner known per se by polymerising the monomers (styrene and acrylonitrile) to be grafted on in a latex of the polydiolefine (polybutadiene) that serves as grafting base. In principle, the same procedure is used as with the production of the resin components, as will later be more fully explained.

The grafting base for the production of A is a 1,3-diolefine latex, advantageously a butadiene homopolymer or copolymer latex with at least 90% of 1,3-diolefine in the polymer, produced by emulsion polymerisation of the monomers in a manner which is known in principle. The emulsifiers, regulators, catalysts and electrolytes described in connection with the production of B can be employed within the limits indicated therein.

The thermoplastic copolymer component comprising styrene and acrylonitrile is advantageously prepared by polymerising the monomers in aqueous emulsion. The usual water quantities, emulsifiers, regulators, polymerisation catalysts, pH regulators and other additives can be used. By way of example, the monomer or polymer concentration is 20–50%, i.e. 400–100 parts by weight of water are used to 100 parts by weight of monomer.

The following are examples of emulsifiers which can be employed: sodium, potassium and ammonium salts of long-chain fatty acids with 10–20 carbon atoms, alkyl sulphates, alkyl sulphonates and alkylaryl sulphates with 10–20 carbon atoms and resin acids (e.g. derivatives of abietic acid). The preferred emulsifiers are those which lose their emulsifier properties below pH 7 because of formation of the free acids.

Long-chain mercaptans such as dodecyl mercaptan can be added, for example, to regulate the molecular weight and thus to adjust the K-value.

The polymerisation catalysts can be inorganic or organic peroxy compounds or azo compounds, such as potassium or ammonium persulphate, tert.-butyl hydroperoxide, cumene hydroperoxide or azo diisobutyronitrile. It is also possible to employ redox systems of these peroxy compounds and reducing agents, more especially acids of sulphur in low valency states, such as formaldehyde sulphoxylate, and also bases such as triethanolamine.

Salts of orthophosphoric or pyrophosphoric acid can, for example, be added as pH regulators. The polymerisation can be carried out at pH values between 2 and 11; it is advantageous to work at pH 7 to 11.

The polymerisation temperatures can be 20–100° C., advantageously 40–90° C.

The oil emulsion can be prepared by stirring the oil concerned into an aqueous emulsifier solution, using a high-speed stirrer. Preferably 0.5 to 2 parts of water are used to 1 part of oil. The emulsifiers can be the same ones as are employed to produce the graft polymer and styrene-acrylonitrile copolymer (see above). The quantity is preferably 0.5 to 5%, calculated on the oil.

Many different methods can be used to blend the plastic copolymer components to be used according to the present invention and the elastomeric graft copolymer components.

(1) It is possible to mix non-emulsified oil with the coagulate of the latex mixture consisting of the components A and B. The oil itself is absorbed relatively well in the presence of water.

(2) The oil can be incorporated, using suitable mixer assemblies (e.g. a Banbury mixer), into dry crumbs of the copolymer mixture, preferably with simultaneous addition of pigments and other additives.

(3) According to a preferred embodiment of the present invention, an emulsion of the oil (as explained above), is mixed with the mixture of the latices of the components A and B, preferably at room temperature, and this mixture is coagulated in a manner known per se. It has proved to be particularly advantageous to employ oil emulsions which are as finely divided as possible.

The coagulation of the mixtures according to the preferred procedure (see 3) can take place by methods which are known per se, by adding electrolytes or acids to the latex-oil mixture and possibly heating to relatively high temperature. The type of coagulant which is to be used depends upon the emulsifiers present in the mixture. With agents such as alkyl sulphates and sulphonates, which have an emulsifying action both in the acidic and in the alkaline range, there are mainly employed electrolytes such as sodium chloride, calcium chloride or ammonium sulphate. With emulsifiers which have no emulsifying action in the acidic range, the addition of acid, e.g. hydrochloric acid or acetic acid, is sufficient for the coagulation.

It is also possible to coagulate the mixture by cooling to temperatures below 0° C. ("freezing out").

The working up of the coagulates is effected in a manner analogous to the known processes used to work up coagulates of elastically thermoplastic copolymer mixtures, i.e. by separating the coagulates, washing them so that they are free from electrolyte or neutral and drying them at temperatures below 100° C., preferably in vacuo.

The dried material is consolidated on suitable units, e.g. roll mill, at temperatures between 130 and 180° C., homogenised and, possibly, granulated. The compact masses thus obtained can be subjected to known formation processes on conventional units, such as injection moulding machines. Conventional fillers, pigments or lubricants, such as zinc stearate, calcium stearate or waxes, can be incorporated into the thermoplastic moulding compositions obtained by the present process.

The polymer mixtures according to the invention are characterised in that, in addition to good flow properties, they have a high hardness and a high notch impact toughness, even at very low temperatures, and they have also very good heat stability.

This is all the more surprising, since it was for example already known to improve the flow properties of polystyrene by adding mineral oil fractions. With polystyrene, such additives act as fillers and plasticisers, i.e. the mixtures become substantially softer and more elastic. At the same time, in such cases, the hardness and the heat stability are, however, reduced quite considerably.

Furthermore, it would be expected that the non-polar hydrocarbon mixtures of the mineral oil, which are compatible with the non-polar polystyrene, would be completely incompatible with the polar polymers produced with the use of large quantities of acrylonitrile, and would therefore form non-homogeneous compositions with poor mechanical properties. It is, however, surprising that, using relatively large quantities of mineral oil, homogeneous mixtures are obtained which have valuable properties and which show no tendency to migration of the oil fraction.

For the moulding composition according to the invention and having high-quality mechanical properties, it is essential that the graft polymer be present. When using polymer mixtures consisting, for example, of butadiene/acrylonitrile rubber and styrene-acrylonitrile resin, addition of mineral oil certainly produces an improvement in the flowability, but the mechanical properties such as hardness and heat stability are unfavourably influenced.

The parts indicated in the following examples are parts by weight, unless otherwise indicated.

EXAMPLE 1

3710 g. of a 29.2% latex of a graft polymer of 36 parts of styrene and 14 parts of acrylonitrile on 50 parts of polybutadiene (mean particle size in the latex, 100 to 300 m$\mu$) are mixed with 3870 g. of a 44% latex of a copolymer of 72 parts of styrene and 28 parts of acrylonitrile with a K-value of 71.4 and an intrinsic viscosity of 1.31–1.32 and 1030 g. of a 30% emulsion of an aromatic mineral oil with a VDC of 0.951. The ratio graft polymer:resin:oil is then 35/55/10. The polymer-mineral oil mixture thus obtained is coagulated by 1% acetic acid, the coagulate is separated, washed until neutral and dried in vacuo at 70 to 80° C.

The dried material is consolidated and homogenised on a roller mill, withdrawn in strip form and comminuted on a beater mill; from the granulated material, standard small rods are produced by injection moulding, the mechanical properties listed under 1 in Table 1 being determined from these rods.

EXAMPLE 2

In a manner similar to Example 1, 3710 g. of a 29.2% latex of a graft polymer of 34 parts of styrene and 14 parts of acrylonitrile on 50 parts of polybutadiene (mean particle size in the latex, 100 to 300 m$\mu$) are mixed with 3170 g. of a 44% latex of a copolymer of 72 parts of styrene and 28 parts of acrylonitrile, with a K-value of 71.4 and an intrinsic viscosity of 1.31–1.32, and with 2060 g. of a 30% aqueous emulsion of an aromatic mineral oil with a VDC of 0.951. The ratio graft polymer:resin:oil is then 35:45:20. The mixture is precipitated as in Example 1, washed and dried. The crumbly coagulate which is obtained is then further processed as in Example 1. It has the mechanical data which are indicated under 2 in Table 1.

Comparison Experiment A (without addition of oil)

In a manner analogous to Example 1, 3720 g. of a 29.2% graft polymer latex of 36 parts of styrene and 14 parts of acrylonitrile on 50 parts of polybutadiene are mixed with 4580 g. of a 44% latex of a copolymer of 72 parts of styrene and 28 parts of acrylonitrile, with a K-value of 71.4 and an intrinsic viscosity of 1.31–1.32. The ratio between graft polymer and resin is then 35:65.

The working up and further processing of the polymer mixture is effected as in Example 1 and it then has the properties indicated under C in Table 1.

Comparison Example B (without addition of oil)

A polymer mixture is prepared from 55 parts of the graft polymer already described several times with 45 parts of the styrene-acrylonitrile copolymer (intrinsic viscosity 1.34–1.34) and worked up under normal conditions, and there is thus obtained a moulding composition with the mechanical values listed under B in Table 1.

TABLE 1.—COMPARISON OF THE POLYMER/OIL BLENDS ACCORDING TO THE INVENTION WITH UNBLENDED POLYMER

| | Experiment example | | Comparison example | |
|---|---|---|---|---|
| | 1 | 2 | A | B |
| Graft polymer fraction | 35 | 35 | 35 | 55 |
| Copolymer fraction (styrene+acrylonitrile) | 55 | 45 | 65 | 45 |
| Aromatic mineral oil with a VDK of 0.951 | 10 | 20 | | |
| Notched impact strength kpcm./cm.² (according to DIN 53453): | | | | |
| At 20° C | 15.6 | 16.9 | 15.0 | 14.4 |
| At 0° C | 13.8 | 14.4 | 13.8 | 11.9 |
| At −20° C | 12.5 | 13.1 | 10.6 | 8.1 |
| Ball indentation hardness kp./cm.² (according to draft DIN 53456) 60 sec. | 875 | 765 | 1,055 | 640 |
| Workability spiral test (see below),¹ cm. | 81 | 91 | 75 | 74 |
| Heat stability according to Martens ° C | 72 | 67 | 71 | 70 |

¹ Moulded elements are produced by injection moulding under constant conditions (e.g. cylinder temperature 220° C., mould temperature 60° C., injection pressure about 125 atm.). Using a helical mould of circular cross section and a diameter of 8 mm., which carries a graduation in cm. (total length 2m.). The length of the element is a standard for the workability.

When the results of experiment 2 are compared with the Comparison Examples A and B, it is seen that the product according to the invention has much better notch impact strength, especially at lower temperatures. In addition, the workability is greatly improved and the hardness is also improved in comparison with B. The heat rigidity, measured according to Martens, is only slightly influenced.

EXAMPLE 3

3710 g. of a 29.2% latex of a graft polymer of 36 parts of styrene and 14 parts of acrylonitrile on 50 parts of polybutadiene (mean particle size in the latex, 100 to 300 m$\mu$) are mixed with 3870 g. of a 44% latex of a copolymer of 72 parts of styrene and 28 parts of acrylonitrile, with a K-value of 71.4 and an intrinsic viscosity of 1.31 to 1.32, and 1030 g. of a 30% aqueous emulsion of a naphthenic mineral oil with a VDC of 0.885. The working up and further processing of the polymer-mineral oil mixture takes place in the same way as described above. The moulding composition which is obtained has the properties set out under 3 in Table 2.

EXAMPLE 4

3710 g. of a 29.2% latex of a graft polymer of 36 parts of styrene and 14 parts of acrylonitrile on 50 parts of polybutadiene (mean particle size in the latex, 100 to 300 m$\mu$) are mixed with 3170 g. of a 44% latex of a copolymer of 72 parts of styrene and 28 parts of acrylonitrile, with a K-value of 71.4 and an intrinsic viscosity of 1.31–1.32, and 2060 g. of a 30% aqueous emulsion of a naphthenic mineral oil with a VDC of 0.885. The working up and further processing takes place as described in Example 1. The polymer-mineral oil mixture has the properties set out under 4 in Table 2.

TABLE 2

| | Experimental examples | |
|---|---|---|
| | 3 | 4 |
| Graft polymer fraction | 35 | 35 |
| Copolymer fraction (styrene+acrylonitrile) | 55 | 45 |
| Naphthenic mineral oil with VDC=0.885 | 10 | 20 |
| Notched impact strength kpcm./cm.²: | | |
| At 20° C | 18.1 | 18.8 |
| At 0° C | 16.3 | 18.1 |
| At −20° C | 14.4 | 16.3 |
| At −40° C | 11.3 | 15.6 |
| Ball indentation hardness kp./cm.²/measurement at 60 sec. | 760 | 565 |
| Workability spiral test cm | 81 | 87.5 |
| Heat stability according to Martens ° C | 67 | 65 |

As compared with the Comparison Examples A and B, there is an improvement in the notch impact toughness at room temperature and lower temperatures and also in the workability.

EXAMPLE 5

3710 g. of a 29.2% latex of a graft polymer of 36 parts of styrene and 14 parts of acrylonitrile on 50 parts of polybutadiene (mean particle size in the latex, 100 to 300 mµ) are mixed with 3870 g. of a 44% latex of a copolymer of styrene and acrylonitrile, with a K-value of 71.4 and an intrinsic viscosity of 1.31–1.32, and with 1030 g. of a 30% aqueous emulsion of an aromatic mineral oil with a VDC of 0.954. On working up and further processing as described in Example 1, a mixture is obtained which has the data described under 5 in Table 3.

EXAMPLE 6

3710 g. of a 29.2% latex of a graft polymer of 36 parts of styrene and 14 parts of acrylonitrile on 50 parts of polybutadiene (mean particle size in the latex 100 to 300 mµ) are mixed with 3170 g. of a 44% latex of a copolymer of 72 parts of styrene and 28 parts of acrylonitrile, with a K-value of 71.4 and an intrinsic viscosity of 1.31–1.32 and with 2000 g. of a 30% aqueous emulsion of an aromatic mineral oil with a VDC of 0.954 and then worked up. The further processing is carried out as already described. A moulding composition is obtained which has the mechanical properties enumerated under 6 in Table 3.

Comparison Example C 3600 g. of a 30% latex of a graft polymer of 36 parts of styrene and 14 parts of acrylonitrile on 50 parts of polybutadiene (mean particle size in the latex, 100 to 300 mµ) are mixed with 2470 g. of a 44% latex of a copolymer of 72 parts of styrene and 28 parts of acrylonitrile, with a K-value of 71.4 and an intrinsic viscosity of 1.31–1.32, and with 3050 g. of a 30% aqueous emulsion of an aliphatic mineral oil with a VDC of 0.788. The working up takes place as already described. The polymer-mineral oil mixture could no longer be worked on a roller, however, since there is no longer any compatibility between the mineral oil and the polymer mixture.

Comparison Example D 3600 g. of the graft polymer latex already described under C were mixed with 3170 g. of a 44% latex of a copolymer of 72 parts of styrene and 28 parts of acrylonitrile, as likewise described in Example C and with 2060 g. of a 30% aqueous emulsion of an aliphatic mineral oil with a VDC of 0.788. The ratio between graft polymer, resin and oil is 35:45:20. The working up and further processing of the polymer-mineral oil mixture takes place as previously described.

A moulding composition is obtained which has the mechanical properties shown under D in Table 3.

EXAMPLE 7

3780 g. of a 28.7% latex of a graft polymer of 36 parts of styrene and 14 parts of acrylonitrile on 50 parts of polybutadiene (mean particle size in the latex, 100 to 300 mµ) are mixed with 3910 g. of a 43.6% latex of a copolymer of 72 parts of styrene and 28 parts of acrylonitrile, with a K-value of 75 and an intrinsic viscosity of 1.34–1.34, and with a 30% aqueous emulsion of a naphthenic mineral oil with a VDC of 0.885. The ratio between graft polymer, resin and oil is 35:55:10. If the working up and further processing are carried out as before the results listed in Table 4 are obtained.

EXAMPLE 8

2700 g. of a 28.7% latex of a graft polymer of 36 parts of styrene and 14 parts of acrylonitrile on 50 parts of polybutadiene (mean particle size in the latex, 100 to 300 mµ) are mixed with 4620 g. of a previously described styrene-acrylonitrile latex and with 1030 g. of a 30% aqueous emulsion of a naphthenic mineral oil with a VDC=0.885. The ratio between graft polymer, resin and oil is 25:65:10. In other respects, the procedure is exactly the same as before.

EXAMPLE 9

This is carried out as in the preceding examples, but the ratio graft polymer:styrene-acrylonitrile copolymer: naphthenic mineral oil with a VDC=0.885 is 15:75:10. The material thus obtained has the properties indicated.

EXAMPLE 10

The ratio graft polymer:styrene-acrylonitrile copolymer:naphthenic mineral oil with a VDC=0.885 is, in this example 10:80:10. (K-value of the resin component 75, intrinsic viscosity:1.34–1.34). The mixting, working up and further processing takes place as previously described. The moulding composition has the mechanical data listed under 10 in Table 4.

Comparison Example E

If a polymer mixture is prepared from 10 parts of the already described graft polymer with 90 parts of the styrene-acrylonitrile copolymer (K-value 75 and an intrinsic viscosity of 1.34–1.34) and if working up takes place under the normal conditions, a moulding composition is obtained which has the mechanical data listed in Table 4.

TABLE 3

| | Experiment 5 | Comparison C | Experiment 6 | Comparison D |
|---|---|---|---|---|
| Graft polymer fraction | 35 | 35 | 35 | 35 |
| Copolymer fraction (styrene+acrylonitrile) | 35 | 35 | 45 | 45 |
| Aromatic mineral oil with a VDC=0.954 | 30 | | 20 | |
| Aliphatic mineral oil with a VDC=0.788 | | 30 | | 20 |
| Notched impact strength kpcm./cm.$^2$: | | | | |
| At 20° C | 15.0 | (¹) | 17.5 | 17.5 |
| At 0° C | 15.0 | | 15.0 | 18.1 |
| At −20° C | 13.1 | | 13.1 | 17.5 |
| Flexural stress kp./cm.$^2$ (according to DIN 53456) | 506 | | 619 | 475 |
| Ball indentation hardness (kp./cm.$^2$) measured after 60 sec | 610 | | 700 | 495 |

¹ Owing to separation of the oil from the polymer, it is not possible to determine mechanical properties, see also description of Comparison Example C.

TABLE 4.—VARIATION OF THE GRAFT POLYMER CONTENT. MECHANICAL PROPERTIES OF THE MIXTURE

|  | Test examples | | | Comparison examples | |
| --- | --- | --- | --- | --- | --- |
|  | 7 | 8 | 9 | 10 | E |
| Graft polymer fraction | 35 | 25 | 15 | 10 | 10 |
| Copolymer fraction styrene-acrylonitrile K-value 75 | 55 | 65 | 75 | 80 | 90 |
| Naphthenic mineral oil VDC=0.885 | 10 | 10 | 10 | 10 |  |
| Notched impact strength kpcm./cm.$^2$: |  |  |  |  |  |
| At 20° C | 18.1 | 18.1 | 13.1 | 10.0 | 4.4 |
| At 0° C | 16.3 | 15.0 | 11.9 | 5.6 |  |
| At −20° C | 14.4 | 12.1 | 7.5 | 5.0 | 3.5 |
| At −40° C | 12.5 | 7.5 | 5.0 |  |  |
| Impact strength kpcm./cm.$^2$ |  |  | 87.1 | 72.9 | 38.3 |
| Ball indentation hardness measured after 60 seconds, kp./cm.$^2$ | 790 | 925 | 1,080 | 1,180 | 1,120 |
| Workability spiral test cm | 72 | 75 | 77 | 80 | 67 |
| Heat stability according to Martens °C | 71 | 70 | 71 | 70 | 80 |

In the foregoing comparisons, the high hardness shown by the oil blend is particularly outstanding, this being in some examples even higher than in the comparison example.

EXAMPLE 11

2700 g. of a 28.7% latex of a graft polymer of 26 parts of styrene and 14 parts of acrylonitrile on 50 parts of polybutadiene (mean particle size in the latex, 100 to 300 mμ) are mixed with 4270 g. of a 43.6% latex of a copolymer of 72 parts of styrene and 28 parts of acrylonitrile, of K-value 75 and intrinsic viscosity of 1.34–1.34, and with 1550 g. of a 30% aqueous emulsion of a naphthenic mineral oil with VDC=0.885. The ratio graft polymer:styrene-acrylonitrile copolymers:naphthenic mineral oil is 25:60:15. The working up and further processing of the moulding composition take place as described in Example 1 and a product is obtained which has a hardness of 780 kg./cm.$^2$ and a notched impact strength at −20° C. of 14.

EXAMPLE 12

1600 g. of a 28.7% latex of a graft polymer of 36 parts of styrene and 14 parts of acrylonitrile on 50 parts of polybutadiene (mean particle size in the latex, 100 to 300 mμ) are mixed with 4980 g. of a 43.6% latex of a copolymer of 72 parts of styrene and 28 parts of acrylonitrile (K-value, 75, intrinsic viscosity 1.34–1.34) and with 1550 g. of a 30% aqueous emulsion of a naphthenic mineral oil with a VDC=0.885 and then worked up. The ratio graft polymer:styrene-acrylonitrile copolymer:naphthenic oil is 15:70:15. After rolling and granulation the plastic composition obtained has a hardness of 1050 kg./cm.$^2$ and a bending strength of 800 kp./cm.$^2$.

EXAMPLE 13

1080 g. of a 28.7% latex of a graft polymer of 36 parts of styrene and 14 parts of acrylonitrile on 50 parts of polybutadiene (mean particles size in the latex, 100 to 300 mμ) are mixed with 5330 g. of a 43.6% latex of a copolymer of styrene and acrylonitrile (72:28) with a K-value of 75 and an intrinsic viscosity of 1.34–1.34 and with 1550 g. of a 30% aqueous emulsion of a naphthenic mineral oil with a VDC=0.885. The ratio graft polymer:styrene-acrylonitrile copolymer:naphthenic oil is then 10:75:15. After working up, rolling and granulation, the moulding composition has a hardness of 1110 kp./cm.$^2$ and a notched impact strength (20° C.) of 10.6 kpcm./cm.$^2$.

EXAMPLES 14–16

The graft polymer used in Examples 14–16 consisted of 35 parts of styrene and 15 parts of acrylonitrile, which were grafted on 50 parts of polybutadiene.

The resin component was a copolymer of 70 parts of α-methyl styrene and 30 parts of acrylonitrile with an intrinsic viscosity of 0.66–0.60.

The mineral oil employed was an aromatic mineral oil which had a VDC of 0.954.

The production, working up and further processing of the polymer-mineral oil mixture were carried out in the same way as before. The ratio graft polymer:α-methyl styrene-acrylonitrile copolymer:aromatic mineral oil was varied in the following manner:

|  | Graft polymer | Copolymer | Aromatic mineral oil VDC 0.954 |
| --- | --- | --- | --- |
| Example 14 | 25 | 72 | 3 |
| Example 15 | 25 | 69 | 6 |
| Example 16 | 25 | 66 | 9 |

The mechanical properties of the moulding compositions thus obtained are set out in Table 7.

Comparison Example F 2615 g. of a 32% latex of the graft polymer already repeatedly described are mixed with 6560 g. of a 34.5% latex of a copolymer of 70 parts of α-methyl styrene and 30 parts of acrylonitrile (K-value 52.2, intrinsic viscosity 0.66–0.60) and then worked up. The ratio graft polymer:α-methylstyrene-acrylonitrile copolymer is 27:73. After rolling and granulation, the polymer mixture has the mechanical data listed under E in Table 7.

TABLE 7

|  | 14 | 15 | 16 | F |
| --- | --- | --- | --- | --- |
| Notched impact strength kpcm./cm.$^2$: |  |  |  |  |
| At 20° C | 10.0 | 10.0 | 9.4 | 7.5 |
| At 0° C | 6.9 | 6.9 | 6.9 | 6.3 |
| Ball indentation hardness measured after 60 seconds kg./cm.$^2$ | 1,120 | 1,090 | 1,060 | 1,150 |
| Workability spiral test cm | 70 | 71.5 | 75 | 66 |
| Heat stability according to Martens °C | 75 | 75 | 74 | 77 |

EXAMPLE 17

2340 g. of a 20% latex of a graft polymer of 14 parts of styrene and 6 parts of acrylonitrile on 80 parts of polybutadiene (prepared by the process of German patent applicaiton No. F 37,972 IVd/39b filed Oct. 5, 1962) by grafting onto a polybutadiene latex with a mean particle size smaller than 100 mμ, are mixed with 4840 g. if a 43.6% latex of a copolymer of 72 parts of styrene and 28 parts of acrylonitrile, with a K-value of 75 and an intrinsic viscosity of 1.31–1.32 and with 1030 g. of a 30% aqueous emulsion of a naphthenic mineral oil with a VDC of 0.885. The ratio graft polymer:resin:mineral oil is then 22:68:10. The working up and further processing of the polymer-mineral oil mixture is effected in the same manner as previously described. The moulding composition which is obtained shows the mechanical properties which are listed under 17 in Table 8.

Comparison Example G 2340 g. of the graft latex described in Example 17 are mixed with 5550 g. of a 43.6% latex of a copolymer of 72 parts of styrene and 28 parts of acrylonitrile with a K-value of 75 and an intrinsic viscosity of 1.31–1.32. The ratio graft polymer:resin is then 22:78. After working up and further processing, the moulding composition thus obtained shows the mechanical values which are indicated under G in Table 8.

TABLE 8

|  | 17 | G |
| --- | --- | --- |
| Graft polymer | 22 | 22 |
| Copolymer styrene-acrylonitrile K-value 75 | 68 | 78 |
| Naphthenic mineral oil VDC=0.885 | 10 |  |
| Notched impact strength kpcm./cm.$^2$ |  |  |
| At 20° C | 26.9 | 21.2 |
| At 0° C | 22.5 | 18.1 |
| At −20° C | 20.0 | 16.3 |
| At −40° C | 18.1 | 14.4 |
| Ball indentation hardness kp./cm.$^2$ | 650 | 830 |
| Workability spiral test cm | 64 | 55 |
| Heat stability according to Martens °C | 71 | 71 |

By comparing the results of Example 17 with the Comparison Example G, it is shown that the product according to the invention has substantially better notch impact toughness, especially at low temperatures, and has also greatly improved workability. The heat stability is the same.

EXAMPLE 18

2270 g. of a 28.7% latex of a graft polymer of 36 parts of styrene and 14 parts of acrylonitrile on 50 parts of polybutadiene are mixed with 4630 g. of a 43.5% latex of a styrene-acrylonitrile copolymer, with the K-value 50.7 and an intrinsic viscosity of 0.67–0.62, and with 1440 g. of a 30% aqueous emulsion of a naphthenic mineral oil with a VDC of 0.885. The ratio graft polymer:resin:oil is 21:65:14. Working up and further processing took place in the usual way and the moulding composition thus obtained has the mechanical properties listed under 18 in Table 9.

EXAMPLE 19

The copolymer of 72 parts of styrene and 28 parts of acrylonitrile with a K-value of 50.7 and an intrinsic viscosity of 0.67 to 0.62, used in Example 18, is replaced in Example 19 by a styrene-acrylonitrile copolymer (72 parts of styrene and 28 parts of acrylonitrile) which has a K-value of 33.9 and an intrinsic viscosity of 0.33–0.34. The ratio graft polymer:resin:oil is again 21:65:14. Working up and further processing takes place as already described and the polymer-mineral oil mixture has the mechanical data listed under 19 in Table 9.

Comparison Example H

Instead of the styrene-acrylonitrile copolymer of 72 parts of styrene with 28 parts of acrylonitrile and a K-value of 50.7 and an intrinsic viscosity of 0.67–0.62, as used in Example 18, there is employed a styrene-acrylonitrile copolymer with the K-value 72.4 and an intrinsic viscosity of 1.31–1.32. The ratio graft polymer:resin:mineral oil is also 21:65:14, in this case.

The moulding composition obtained after working up and further processing has the mechanical properties which are indicated in Table 9.

TABLE 9

|  | Test Examples | | Comparison Example |
|---|---|---|---|
|  | 18 | 19 | H |
| Graft polymer | 21 | 21 | 21 |
| Copolymer styrene-acrylonitrile: | | | |
| K-value 50.7 | 65 | | |
| K-value 33.9 | | 65 | |
| K-value 71.4 | | | 65 |
| Naphthenic mineral oil VDC=0.885 | 14 | 14 | 14 |
| Notched impact strength kpcm./cm.²: | | | |
| At 20° C | 6.9 | (¹) | 15.0 |
| At 0° C | 5.0 | (²) | 14.4 |
| Impact strength kpcm./cm.² | 65.4 | 4.2 | |
| Flexural stress kp./cm.² | 725 | ³ 338 | 750 |
| Ball identation hardness kp./cm.² | 965 | 865 | 910 |

¹ Breaks.
² Immediately.
³ 1.3 mm.

It is clear from the table that moulding compositions of which the resin component has a K-value of 30 or 50 only have very poor mechanical data.

What we claim is:

1. A cold-resistant molding composition with high impact and notched impact strength containing:
   (A) 5–97 percent by weight of a graft copolymer of
      (a) 10–95 percent by weight of a mixture of 50–90 percent by weight of styrene and 50–10 percent by weight of a member selected from the group consisting of acrylonitrile and methacrylonitrile on
      (b) 90–5 percent by weight of a polymer of an an aliphatic conjugated diolefine having from 4 to 6 carbon atoms with at least 90 percent by weight of said conjugated diolefine incorporated by polymerization;
   (B) 10–92 percent by weight of a thermoplastic copolymer of 50–95 percent by weight of styrene and 50–5 percent by weight of a member selected from the group consisting of acrylonitrile and methacrylonitrile and
   (C) 3–30 percent by weight of a mineral oil having a viscosity-density constant between 0.820 and 1.050, the combined weight of said polymeric diolefine and said mineral oil being up to 50 percent by weight of said total molding composition.

2. A cold-resistant molding composition of elastomeric copolymers of conjugated diolefines and thermoplastic copolymers of acrylonitrile and styrene, wherein said molding composition contains
   (A) 5–60 percent by weight of a graft copolymer of
      (a) 10–80 percent by weight of a mixture of 50–90 percent by weight of styrene and 50–10 percent by weight of a member selected from the group consisting of acrylonitrile and methacrylonitrile on
      (b) 20–90 percent by weight of a polymer of an aliphatic conjugated diolefine having from 4 to 6 carbon atoms with at least 90 percent by weight of said conjugated diolefine being incorporated by polymerization;
   (B) 10–92 percent by weight of a thermoplastic copolymer of 50–95 percent by weight of styrene and 50–5 percent by weight of a member selected from the group consisting of acrylonitrile and methacrylonitrile and
   (C) 3–30 percent of a mineral oil having a viscosity-density constant between 0.820 and 1.050, the combined weight of said polymeric diolefine and said mineral oil being up to 50 percent by weight of said total molding composition.

3. The composition of claim 2 wherein said graft copolymer (A) is a graft copolymer of (a) 10–80 percent by weight of a mixture of 50–90 percent by weight of styrene and 50–10 percent by weight of acrylonitrile on (b) 20–90 parts of a polymer of at least 90 percent by weight of butadiene and 0–10 percent by weight of a copolymerizable monovinyl compound.

4. The composition of claim 2 wherein said thermoplastic copolymer component (B) contains 95–65 percent by weight of styrene and 5–35 percent by weight of acrylonitrile.

5. The composition of claim 2 wherein said thermoplastic copolymer component (B) has a Fikentscher K-value higher than 65.

6. The composition of claim 3, wherein a polymer with at least 90% of butadiene incorporated by polymerization and having a gel content of more than 80% is used as grafting base for the graft copolymer of component (A).

References Cited

UNITED STATES PATENTS

| 2,802,808 | 8/1957 | Hayes | 260—45.5 |
| 2,844,562 | 7/1958 | Ingram | 260—45.5 |
| 2,935,485 | 5/1960 | Reynolds | 260—23.7 |
| 2,999,822 | 9/1961 | Pfau et al. | 260—2.5 |
| 3,010,936 | 11/1961 | Irvin | 260—760 |

MORRIS LIEBMAN, *Primary Examiner.*

J. H. DERRINGTON, *Assistant Examiner.*